US00RE38603E1

(19) United States
(12) Reissued Patent
Kim et al.

(10) Patent Number: US RE38,603 E
(45) Date of Reissued Patent: Sep. 28, 2004

(54) DATA TRANSMITTER AND RECEIVER OF A SPREAD SPECTRUM COMMUNICATION SYSTEM USING A PILOT CHANNEL

(75) Inventors: Je-Woo Kim, Sungman-si (KR); Byeong-Ho Lee, Seoul (KR); Jong-Hyeon Park, Seoul (KR)

(73) Assignee: Samsung Electronics Co., Ltd., Suwon-si (KR)

( * ) Notice: This patent issued on a continued prosecution application filed under 37 CFR 1.53(d), and is subject to the twenty year patent term provisions of 35 U.S.C. 154(a)(2).

(21) Appl. No.: 09/492,065

(22) Filed: Jan. 27, 2000

Related U.S. Patent Documents

Reissue of:
(64) Patent No.: 5,712,869
Issued: Jan. 27, 1998
Appl. No.: 08/562,281
Filed: Nov. 22, 1995

(30) Foreign Application Priority Data

Nov. 22, 1994 (KR) ..... 1994/30743

(51) Int. Cl.[7] ..... H04B 1/69
(52) U.S. Cl. ..... 375/141; 375/146; 375/147; 375/143; 375/130; 370/209
(58) Field of Search ..... 375/130, 367, 375/146, 147; 370/208, 209, 203, 515, 522, 525

(56) References Cited

U.S. PATENT DOCUMENTS 3,465,269 A * 9/1969 Schaffner et al. ..... 375/130
5,036,523 A * 7/1991 Briskman ..... 375/130
5,103,459 A 4/1992 Gilhousen et al.

(List continued on next page.)

OTHER PUBLICATIONS

Physical Layer Standard for CDMA 2000 Standards for Spread Spectrum Signals, TIA–EIA–IS–2000.2–A, Telecommunications Industry Association, Mar. 2000.

Physical Layer Standard for CDMA 2000 Standards Spread Spectrum Signals—Third Generation Partnership Project 2 "300GP P2", Telecommunications Industry Association, Jun. 9, 2000.

Illustrated Encyclopedic Dictionary of Electronics, Second Edition, John Douglas–Young, Prentice–Hall, Inc., Englewood Cliffs, N.J. 07632 1987.

Communications Standard Dictionary, Second Edition, Martin H. Weik, DSc., Dynamic Systems, Inc. Reston, Virginia, Van Nostrand Reinhold N.Y., 1989.

*Primary Examiner*—Temesghen Ghebretinsae
(74) *Attorney, Agent, or Firm*—Robert E. Bushnell, Esq.

(57) ABSTRACT

An improved spread spectrum communication system includes a transmitter and a receiver utilizing a pilot channel for the transmission of pure rather than modulated PN codes for code acquisition or tracking purposes with a lower bit error rate. The pilot signal is used to obtain initial system synchronization and phase tracking of the transmitted spread spectrum signal. At the transmitter side, [Walsh] *an orthogonal* code generator, a [Walsh] modulator, a first PN code generator, a first band spreader, a second band spreader, finite impulse response filters, digital-to-analog converter, low-pass filters, an intermediate frequency mixer, a carrier mixer, a band-pass filter are used to transmit a spread spectrum signal. At the receiver side, a corresponding band-pass filter, a carrier mixer, an intermediate-frequency mixer, low-pass filters, analog-digital converters, a second PN code generator, an I channel despreader, a Q channel despreader, a PN code synchronization controller, [a Walsh] *an orthogonal*code generator, a first [Walsh] demodulator, a second [Walsh] demodulator, accumulator & dump circuits, a combiner, and a data decider are used to demodulate a received spread spectrum signal.

34 Claims, 4 Drawing Sheets

U.S. PATENT DOCUMENTS 5,136,612 A 8/1992 Bi
5,228,054 A 7/1993 Rueth et al.
5,309,474 A * 5/1994 Gilhousen et al. ..... 375/130
5,383,219 A * 1/1995 Wheatley ..... 375/130
5,383,220 A * 1/1995 Murai ..... 375/130
5,406,629 A * 4/1995 Harrison et al. ..... 380/34
5,414,728 A * 5/1995 Zehavi ..... 375/130
5,416,797 A * 5/1995 Gilhousen et al. ..... 375/130
5,490,165 A * 2/1996 Blakeney et al. ..... 375/130
5,608,722 A 3/1997 Miller
5,859,612 A 1/1999 Gilhousen
5,926,500 A * 7/1999 Odenwalder ..... 375/130
5,940,434 A * 8/1999 Lee et al. ..... 375/130
6,246,715 B1 * 6/2001 Park et al. ..... 375/146

* cited by examiner

DATA TRANSMITTER AND RECEIVER OF A SPREAD SPECTRUM COMMUNICATION SYSTEM USING A PILOT CHANNEL

Matter enclosed in heavy brackets [ ] appears in the original patent but forms no part of this reissue specification; matter printed in italics indicates the additions made by reissue.

*This application is a parent of a continuing reissue application filed on Apr. 16, 2003 assigned Ser. No. 10/414, 203, and is a reissue of U.S. Pat. No. 5,712,869 issued Jan. 27, 1998.*

CROSS-REFERENCE TO RELATED APPLICATIONS

This application makes reference to, incorporates the same herein, and claims all benefits accruing under 35 U.S.C. §119 from an application for Data Transmitter And Receiver Of A Spread Spectrum Communication System Using a Pilot Channel earlier filed in the Korean Industrial Property Office on 22 Nov. 1994 and assigned Ser. No. 30743/1994.

BACKGROUND OF THE INVENTION

1. Technical Field

The present invention relates to a spread spectrum communication system, and more particularly to data transmitter and receiver of the spread spectrum communication system using a pilot channel.

2. Background Art

Conventionally, narrow band modulation systems (such as for example, amplitude modulation, frequency modulation and phase shift key modulation) have been used in the field of data communication. With such systems, demodulation at the receiver can be achieved with a relatively small amount of circuitry. Such systems, however, are weak due to multipath fading and narrow band noise.

By contrast, in spread spectrum communication systems, a data spectrum is spread by a pseudo-noise code (hereinafter "PN code") at a transmitting side, while the pseudo noise code and the data are synchronized at a receiving side to that the adverse effects of multipath fading and narrow band noise can be reduced. Accordingly, spread spectrum communication systems have attracted increased attention as a promising technique for radio frequency transmission of binary data.

One example for such a spread spectrum communication system is disclosed in U.S. Pat. No. 5,400,359 entitled Spread Spectrum Communication System and An Apparatus For Communication Utilizing This System issued to Hikoso et al. on 21 Mar. 1995. In Hikoso et al. '359, a pseudo noise code is generated and multiplied by data to generate a multiplied result which is then subjected to binary phase-shift key (BPSK) modulation, although other phase-shift key modulation such as, for example, differential phase-shift key modulation (DPSK) may also be used. The pseudo noise code is also subjected to BPSK modulation, delayed by at least one chip of the pseudo noise code, combined with a modulated signal, converted into a radio requency (RF) signal, and transmitted from an antenna. The transmitted spread spectrum signal is received at a receiving end where a complementary receiving method is provided. In essence, the spread spectrum communication involves the art of expanding the bandwidth of a signal, transmitting the expanded signal, and recovering the desired signal by remapping the received spread spectrum into the original information bandwidth. The purpose of spread spectrum techniques is to allow the system to deliver error-free information in a noisy signal environment.

In such a spread spectrum communication system however, since the spectrum of the information signal is spread by a PN code having a broader spectrum width, i order to correctly restore the information signal, it is necessary to synchronize the demodulation PN code which is generated at the receiving side with the modulation PN code which is generated at the transmitting side. Proper phase synchronization may be achieved when the received spread spectrum signal is accurately timed in both its spreading PN code pattern position and its rate of chip generation. The phase synchronization process is typically accomplished in two stages, i.e., an initial synchronization process for finding a synchronous phase and a process for tracking the detected phase. In these conventional spread spectrum receivers, however, initial synchronization and synchronization tracking are often achieved through costly and complex circuitry. Moreover, we have observed that it is difficult to adjust synchronization of the PN code at the receiving side, as the modulated PN code and not pure PN code is transmitted at the transmitting side. Consequently, the time required to establish initial synchronization has not effectively improved.

SUMMARY OF THE INVENTION

Accordingly, it is therefore an object of the present invention to provide a novel and improved spread spectrum communication system utilizing a pilot signal for establishing initial system synchronization.

It is another object of the present invention to provide an improved spread spectrum communication system utilizing a pilot signal for simplifying the synchronization process and minimizing the PN code acquisition time.

It is also an object of the present invention to provide an improved spread spectrum communication system including a transmitter and a receiver capable of utilizing a pilot signal for simplifying the synchronization process and minimizing the PN code acquisition time.

It is also an object of the preset invention to provide a improved spread spectrum communication system capable of providing the transmission and reception of a spread spectrum signal with low bit error rates.

*It is a further object of the invention to provide an improved spread spectrum communication system capable of reducing peak-to-average power ratio (PAR) in a transmitter of a mobile communication system using at least two channels.*

To achieve the above objects of the present invention, the spread spectrum communication system includes a novel and improved transmitter and a complementary receiver capable of establishing a pilot channel for the transmission of pure rather than modulated PN codes for acquisition or tracking purposes.

*To achieve the above objects of the present invention, the spread spectrum communication system is constructed to receive first and second input signals, to spread the first input signal with first and second spreading code signals to produce first and second spread signals, respectively, to spread the second input signal with the first and second spreading code signals to produce third and fourth spread signals, respectively, to produce a first output spread signal by subtracting the fourth spread signal from the first spread signal, and to produce a second output spread signal by*

*adding the second spread signal to the third spread signal, so that the PAR could be reduced upon a radio transmission of the first and second output spread signals.*

The improved transmitter as constructed according to the present invention comprises a first [Walsh] *orthogonal* code generator for generating first and second [Walsh] *orthogonal* codes having respective [Walsh] *orthogonal* code systems; a [Walsh] *orthogonal* modulator for multiplying a predetermined pilot signal and data to be transmitted respectively by the first and second [Walsh] *orthogonal* codes and generating [Walsh-] *orthogonal* modulated pilot signal and data; a first PN code generator for generating first and second PN codes; a first band spreader for multiplying the Walsh-modulated pilot signal by the first and second PN codes, and generating I channel and Q channel band spreaded signals; a second band spreader for multiplying the Walsh-modulated data by the first and second PN codes, and generating I channel and Q channel band spreaded data; a finite impulse response filter for finite impulse response filtering the band spreaded pilot signals and data; a first converter for combining the I channel band spreaded pilot signal and data, and then converting into an I channel analog signal; a second converter for combining the Q channel band spreaded pilot signal and data and then converting into a Q channel analog signal; a lowpass filter for lowpass filtering the I channel and Q channel analog signals; an intermediate frequency mixer for receiving the lowpass filtered I channel and Q channel lowpass filtering signals and an intermediate frequency signal multiplying the I channel lowpass filtering signal by in phase component $\cos W_{IF}t$ of the intermediate frequency signal, the Q channel low-pass filtered signal by a quadrature phase component $\sin W_{IF}t$ of the intermediate frequency signal, and then combining the I channel and Q channel signals which have been mixed with the intermediate frequency; a carrier mixer for multiplying the output signal of the intermediate frequency mixer by a radio frequency signal $\cos W_{IF}t$; a bandpass filter for bandpass filtering the output signal of the carrier mixer; and a first amplifier for amplifying the bandpass filtered signal according to a predetermined amplification ratio for transmission via an antenna.

The complementary receiver as constructed according to the present invention comprises a second amplifier for amplifying a spread spectrum signal received via an antenna; a bandpass filter for bandpass filtering the output signal of the second amplifier; a first mixer for multiplying the output signals of the bandpass filter by the radio frequency signal $\cos W_{RF}t$, and converting into an intermediate frequency signal; a second mixer for multiplying the intermediate frequency signal by an in phase component $\cos W_{IF}t$ and a quadrature phase component $\sin W_{IF}t$ of the intermediate frequency, respectively, and then outputting I channel and Q channel signals from which the carrier frequency signal has been removed; a low-pass filter for low-pass filtering the I channel and Q channel signals, respectively; an analog-digital converter for converting the low-pass filtered I channel and Q channel signals into digital signals; a second PN code generator for generating first and second PN codes in response to a predetermined PN clock; an I channel despreader for multiplying the digital converted I channel output from the analog-digital converter by the first and second PN codes and then outputting a band despreaded I channel signal; a Q channel despreader for multiplying the digital converted Q channel output from the analog-digital converter by the first and second PN codes and then outputting a band despreaded Q channel signal; a PN code sync controller for [Walsh-] demodulating the band despreaded I channel and Q channel signals in response to the first [Walsh] code, detecting the PN code sync status of the Walsh-demodulated I channel and Q channel signals and then outputting a PN clock corresponding to the PN code sync status; [a Walsh] *an orthogonal* code generator for generating first and second [Walsh] codes having respective [Walsh] *orthogonal* code systems; a first [Walsh] demodulator for outputting first and second I channel signals which have been [Walsh] demodulated by the first and second [Walsh] codes; a second [Walsh] *orthogonal* code systems; for outputting first and second Q channel signals which have been [Walsh-] demodulated by the first and second [Walsh] *orthogonal* codes; an accumulator and dump circuit for accumulating and dumping the [Walsh-] demodulated first and second I channel signals and first and second Q channel signals; a combiner for receiving the first and second I channel signals and first and second Q channel signals output from the accumulator and dump circuit, and multiplying the first I channel signal by the second I channel signal to output a combined I channel signal and the first Q channel signal by the second Q channel signal to output a combined Q channel signal; and a data decider for obtaining a difference value between the I channel signal and Q channel signal output from the combiner and then deciding and outputting the data corresponding to the phase of the difference value.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
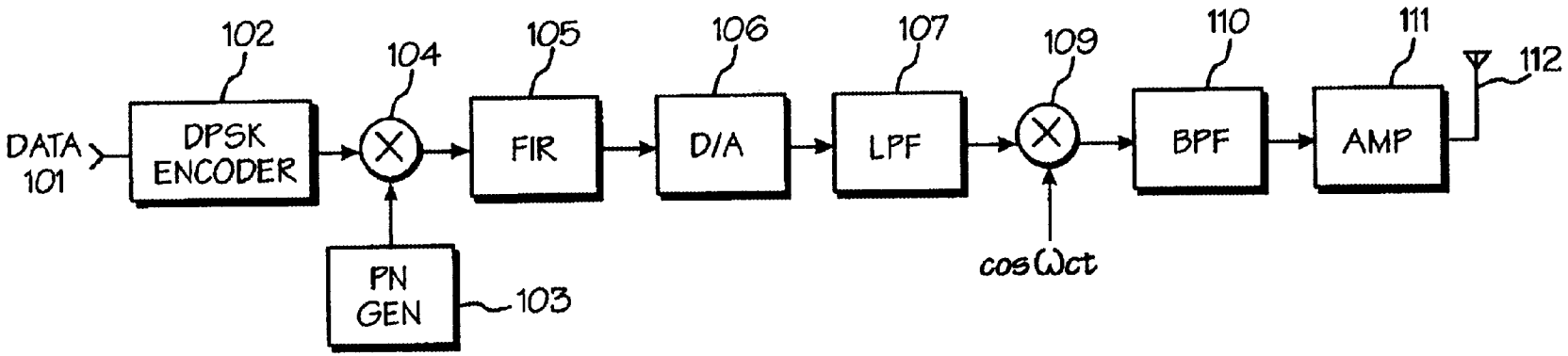
FIG. 1 is a block diagram showing construction of a transmitter for a spread spectrum communication system using a conventional DPSK modulation method.

Referring now to the drawings and particularly to FIG. 1, which illustrates a typical transmitter in a spread spectrum communication system using a conventional differential phase-shift keying (DPSK) modulation technique. The transmitter includes a DPSK encoder 102 for differential-modulating input baseband data; a PN code generator 103 for generating a PN code sequence; a band spreader 104 for band spreading the differentially modulated data by multiplying the differentially modulated data by the PN code sequence; a finite impulse response (hereinafter referred to as an "FIR") filter 105 connected to the band spreader 104, for filtering the band spreaded data; a D/A converter 106 and a LPF 107 serially connected to the FIR filter 105, for converting the band spreaded data into an analog signal and low-pass filtering the analog signal; and a mixer 109 for multiplying the output of the LPF 107 by a carrier signal $\cos W_c t$ for propagation to free space through a bandpass filter (hereinafter referred to as an "BPF") 110, an amplifier 111 and an antenna 112.

The advantage of employing a conventional DPSK modulation technique to modulate the baseband data is that the spread spectrum communication system is enabled to asynchronously detect the modulated data transmitted from a transmitting side during the data demodulation at a receiving side. In this DPSK modulation spread spectrum communication system, however, we have discovered that bit error tends to propagate during the demodulation stage. For example, one bit error during the demodulation stage may result in a two bit error. Consequently, this error propagation deteriorates the overall system performance. Moreover, we have observed that it is difficult to adjust the PN code synchronization at a receiving side, as the modulated PN code and not pure PN code is transmitted at a transmitting side. Consequently, the time required to establish initial synchronization has not effectively improved.

As a result, the present invention envisions a spread spectrum communication system in which the PN code synchronization can be achieved with the pure PN code received at a receiving side in order to minimize the PN code acquisition time and the bit error rates. The spread spectrum communication system according to the present invention contemplates upon a pilot channel in addition to a data channel, in which pure, unmodulated PN code can be transmitted therein for acquisition or tracking purposed at a receiving side. The signal to be transmitted in a spread spectrum communication system utilizing a pilot channel according to the present invention may be largely divided into a pilot signal and data. The data is an information signal, and the pilot signal representing a binary bit of "1" is an additional information signal used for establishing initial PN code synchronization at a receiving side. According to the present invention, the pilot channel and the data channel are separated by a Walsh code sequence.

In the spread spectrum communication system utilizing the pilot channel according to the present invention, as the baseband data and the pilot signal are simultaneously transmitted, the synchronous demodulation of the baseband data can be performed by the pilot signal. Moreover, as the pilot signal to be transmitted at a transmitting side is always "1", the I channel and Q channel PN codes in a pilot channel are pure, unmodulated PN codes. Thus, the PN code synchronization can be established at a receiving side by the pure, unmodulated PN codes.

Figure 2:
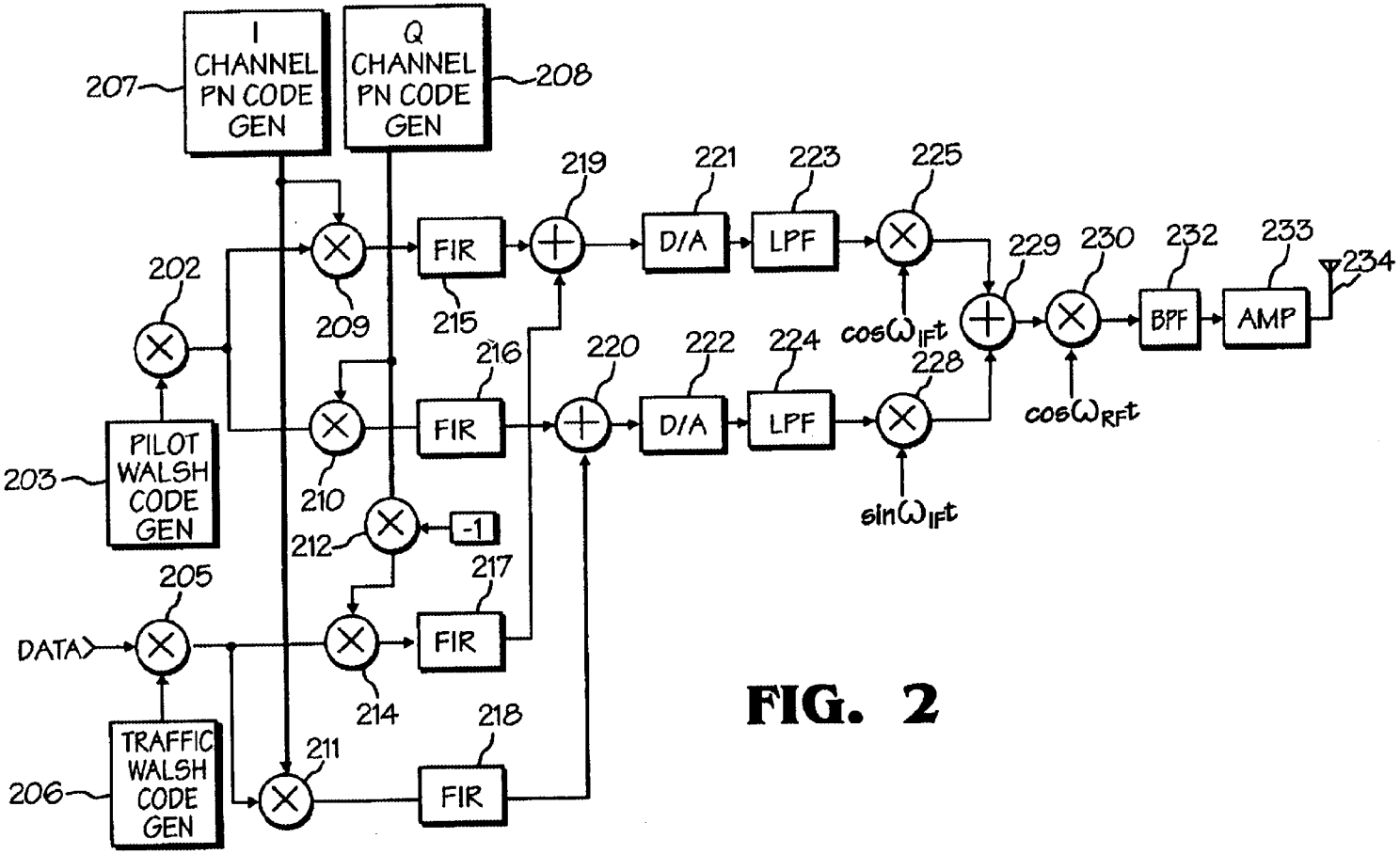
FIG. 2 is a block diagram showing construction a data transmitter of a spread spectrum communication system using a pilot channel according to a preferred embodiment of the present invention; [and]
Figure 2A:
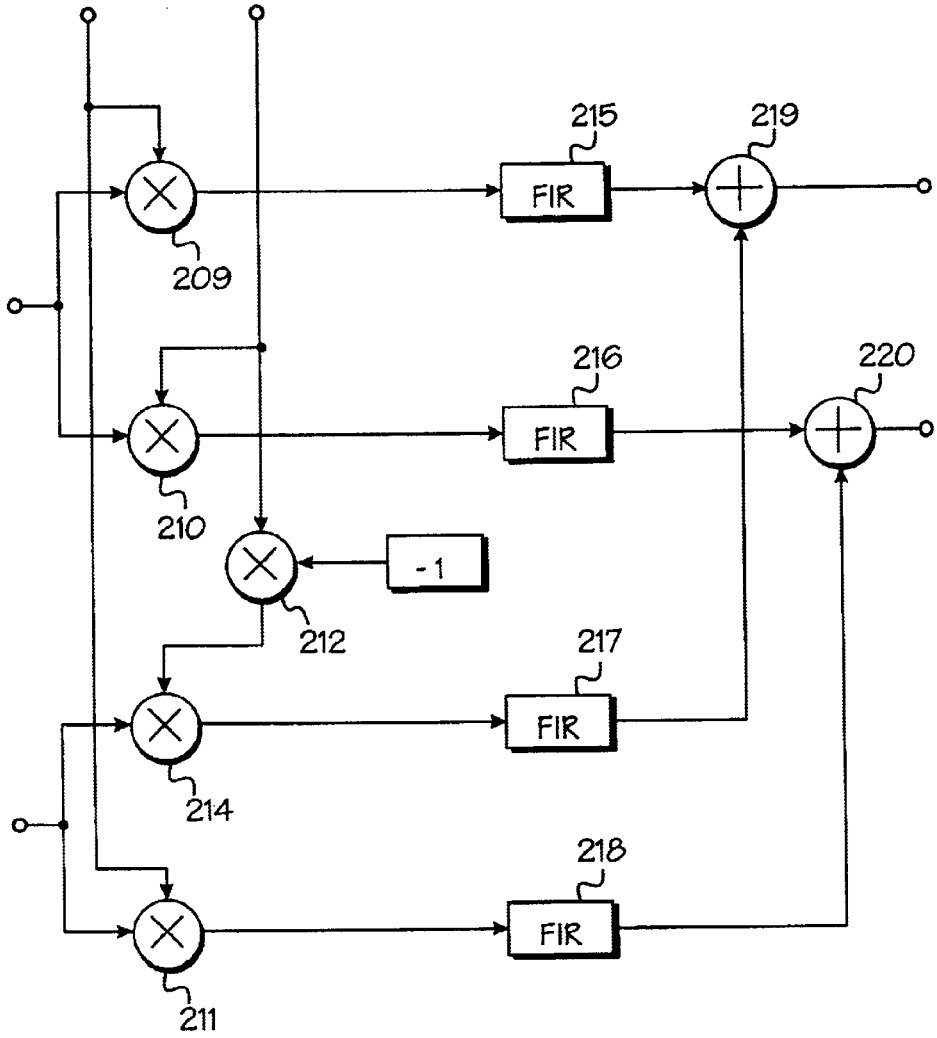
*FIG. 2A is a block schematic diagram illustrating the spreader stage of the communication system shown in FIG. 2; and*

[Turning] *Turn* now to [FIG. 2 which illustrates] *FIGS. 2 and 2A that illustrate* a data transmitter of the spread spectrum communication system utilizing the pilot channel as constructed according to a preferred embodiment of the present invention.

As shown in [FIG. 2] *FIGS. 2 and 2A*, the data transmitter includes a first pilot Walsh code generator 203 and a first traffic Walsh code generator 206 for generating a first and a second Walsh codes, respectively using Walsh functions represented by a set of orthogonal binary sequences that can be easily generated by means well known in the art. *Therefore, a Walsh code is generally called an "orthogonal code"*. A first multiplier 202 modulates a pilot signal according to the first Walsh code generated from the pilot Walsh code generator 203 in order to generate a Walsh-modulated pilot signal. A second multiplier 205 modulates baseband data to be transmitted according to the second Walsh code generated from the traffic Walsh code generator 206 in order to generate Walsh-modulated data.

As in-phase (I) channel PN code generator 207 generates an I channel PN code, and a quadrature-phase (Q) channel PN code generator 208 generates a Q channel PN code. A third multiplier 209 multiplies the Walsh-modulated pilot signal according to the I channel PN code in order to generate an I channel band [spreaded] *spread* pilot signal. A fourth multiplier 210 multiplies the Walsh-modulated pilot signal according to the Q channel PN code in order to generate a Q channel band [spreaded] *spread* pilot signal. A fifth multiplier 211 multiplies the Walsh-modulated data according to the I channel PN code in order to generate I channel band [spreaded] *spread* data. A sixth multiplier 212 multiplies the Q channel PN code by a predetermined value "−1" in order to generate an inverted −Q channel PN code. A seventh multiplier 214 multiplies the Walsh-modulated data according to the −O channel PN code in order to generate −Q channel band [spreaded] *spread* data.

A first FIR filter 215 finite impulse response filters the output of the third multiplier 209. A second FIR filter 216 finite impulse response filters the output of the fourth multiplier 210. A third FIR filter 217 finite impulse response filters the output of the seventh multiplier 214. A fourth FIR filter 218 finite impulse response filters the output of the fifth multiplier 211. The first, second, third, and fourth FIR filters are used to reduce the peaks of the power spectrum density of the transmitted signal and to conceal the transmitted signal from the noise in the communication channel.

A first added 219 combines the output signal of the first FIR filter 215 with the output signal of the third FIR filter 217. A second adder 220 combines the output signal of the second FIR filter 216 with the output signal of the fourth FIR filter 218. A first D/A converter 221 converts the output of the first added 219 into an analog signal. A second D/A converter 222 converts the output of the second adder 220 into an analog signal.

First and second LPFs 223 and 224 respectively low-pass filter the outputs of the first and second D/A converter 221 and 222. An eighth multiplier 225 multiplies the output of the first LPF 223 for an I channel with an in-phase component $\cos W_{IF} t$ of an intermediate-frequency. A ninth multiplier 228 multiplies the output of the second LPF 224 for a Q channel with a quadrature-phase component $\sin W_{IF} t$ of the intermediate frequency. A third adder 229 combines the output of the eighth multiplier 225 with the output of the ninth multiplier 228. A tenth multiplier 230 multiplies the output of the third adder 229 by a carrier signal $\cos W_{RF} t$. A first BPF 232 band-pass filters the output of the tenth multiplier 230. An amplifier 233 amplifies the band-pass filtered signal in accordance with a predetermined amplification ratio in order to generate a spread spectrum signal to be transmitted via an antenna 234.

*As described above, the first input signal is multiplied by the first spreading code signal to produce a first output signal, the first input signal is multiplied by an inverted code of the second spreading code signal to produce a third output signal, the first input signal is multiplied by the first spreading code signal to produce a fourth output signal, the first output signal is added to the third output signal, and then the second output signal is added to the fourth output signal, so that the above spreaded spectrum circuit of the*

*communication system could effectively reduce a value of PAR that should be inevitably taken into account upon design of a power amplifier.*

*The overall operation of this spread spectrum circuit will be substantially similar to that of a spreading circuit in which a second spreading code signal is directly multiplied by a second input signal to therefrom produce a third output signal and the third output signal is subtracted from the first input signal. The above spread spectrum circuit is often referred to in the art as a "complex spreader".*

*Further, the spread spectrum circuit preferably includes a construction to receive a signal "−1" in the sixth multiplier 212 for inverting the second spreading code signal.*

*According to the spread spectrum circuit of the present invention, PAR can be effectively reduced as it allows a phase only of an input signal to be revolved to a phase of PN code, without making any changes to a magnitude of the input signal. Hence, it is appreciated that when PN code is used for a signal spreading circuit as described above, a phase of the PN code does not affect a magnitude of an input signal, thereby keeping the original magnitude of input signal as it was and decreasing PAR of the output signals.*

Figure 3:
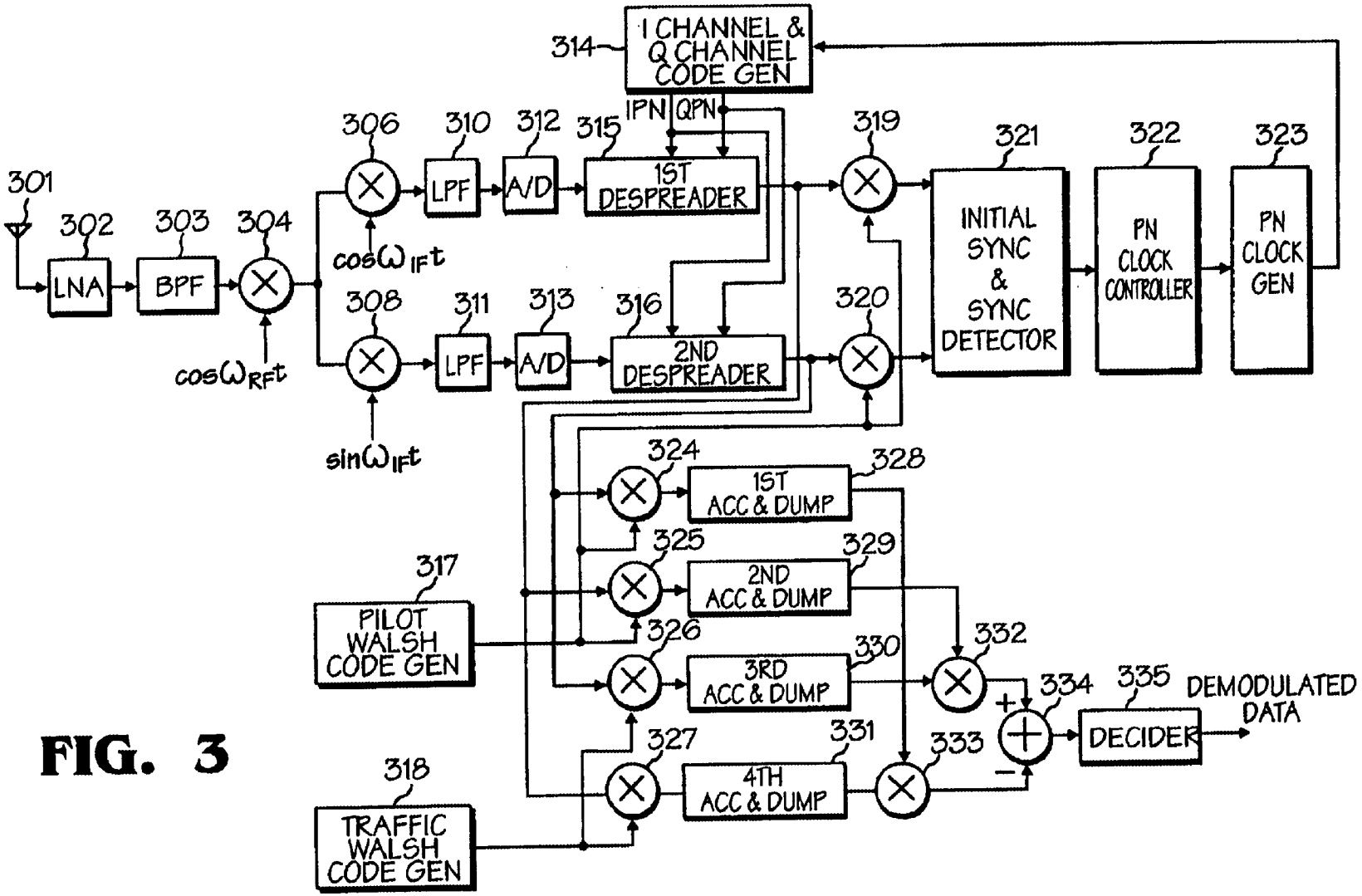
FIG. 3 is a block diagram showing construction of a data receiver of the spread spectrum communication system using the pilot channel according to the preferred embodiment of the present invention.

FIG. 3 illustrates a data receiver of the spread spectrum communication system utilizing the pilot channel as constructed according to the preferred embodiment of the present invention.

As shown in FIG. 3, the data receiver includes a low noise amplifier (LNA) 302 serving as a high frequency amplifier for amplifying a spread spectrum signal received from an antenna 301. A second BPF 303 band-pass filters the amplified spread spectrum signal. An eleventh multiplier 304 multiplies the band-pass filtered signal with a carrier signal $\cos W_{RF}t$ in order to generate an intermediate frequency signal. A twelfth multiplier 306 multiplies the output signal of the eleventh multiplier 304 with an in-phase component $\cos W_{IF}t$ of the intermediate frequency. A thirteenth multiplier 308 multiplies the output signal of the eleventh multiplier 304 with a quadrature-phase component $\sin W_{IF}t$ of the intermediate frequency.

Third and fourth LPFs 310 and 311 low-pass filter the output signals of the twelfth and thirteenth multipliers 306 and 308. First and second A/D converters 312 and 313 respectively convert the low-pass filtered signals into digital signals. An I channel and Q channel PN code generator 314 generates I channel and Q channel PN codes in response to a predetermined PN clock.

A first despreader 315 in a form of a multiplier, multiplies the output signal of the first A/D converter 312 according to the I channel and Q channel PN codes in order to generate a despreaded I channel signal I(t). A second despreader 316 in a form of a multiplier, multiplies the output signal of the second A/D converter 313 according to the I channel and Q channel PN codes in order to generate a despreaded Q channel signal Q(t). A second pilot Walsh code generator 317 generates a first Walsh code according to a first set of Walsh code functions. A second traffic Walsh code generator 318 generates a second Walsh code according to a second set of Walsh code functions. The first and second Walsh codes used in the receiver are identical to the Walsh codes used in the transmitter as shown in FIG. 2.

A fourteenth multiplier 319 multiplies the despreaded I channel signal I(t) according to the first Walsh code in order to generate a Walsh-demodulated I channel signal I(t). A fifteenth multiplier 320 multiplies the despreaded Q channel signal Q(t) according to the first Walsh code in order to generate a Walsh-demodulated Q channel signal Q(t). An initial sync and sync detector 321 receives the Walsh-demodulated signals I(t) and Q(t) output from the fourteenth and fifteenth multipliers 319 and 320, detects the PN code synchronization state of the Walsh-demodulated signals I(t) and Q(t) in order to generate a synchronization detection signal in correspondence with the PN code synchronization state.

A PN clock controller 322 outputs a clock control signal corresponding to the synchronization detection signal, A PN clock generator 323 generates the PN clock for controlling the generation of the I channel and Q channel PN codes in response to the clock control signal. A sixteenth multiplier 24 multiplies the Q channel signal Q(t) output from the second despreaded 316 according to the first Walsh code. A seventeenth multiplier 325 multiplies the I channel signal I(t) output from the first despreader 315 according to the first Walsh code. An eighteenth multiplier 326 multiplies the Q channel signal Q(t) output from the second despreader 316 according to the second Walsh code. A nineteenth multiplier 327 multiplies the I channel signal I(t) output from the first despreaded 315 according to the second Walsh code.

First, second, third, and fourth accumulator and dump circuits 328, 329, 330, 331 respectively accumulate the output signals of the sixteenth, seventeenth, eighteenth, and nineteenth multipliers 324 and 327 for a predetermined symbol duration. A twentieth multiplier 332 multiplies the output signal of the second accumulator and dump circuit 329 with the output signal of the third accumulator and dump circuit 330. A twenty-first multiplier 333 multiplies the output signal of the first accumulator and dump circuit 328 with the output signal of the fourth accumulator and dump circuit 331. A subtracter 334 subtracts the output signal of the twenty-first multiplier 333 from the output signal of the twentieth multiplier 332. A decider 335 detects the phase of data from the output signal of the subtracter 334 in order to generate demodulated data.

The operation of the data transmitter and receiver of the spread spectrum communication system utilizing the pilot channel according to the preferred embodiment of the present invention will now be described in detail with reference to FIGS. 2, *2A* and 3.

In the spread spectrum communication system utilizing the pilot channel according to the present invention, the transmitted signal is comprised of the pilot signal and baseband data as previously described. The pilot signal component forms I channel signal component, and the traffic data component forms Q channel signal component.

The pilot signal and the baseband data are respectively multiplied in accordance with the outputs of the pilot and traffic Walsh code generators 203 and 206 at the first and second multipliers 202 and 205, respectively. Each output of the first and second multipliers 202 and 205 is separated into the I and Q channels. That is, the output of the first multiplier 202 is multiplied according to the I channel PN code generated from the I channel PN code generator 207 at the third multiplier 209, and according to the Q channel PN code generated from the Q channel PN code generator 208 at the fourth multiplier 210. Similarly, the output of the second multiplier 205 is multiplied according to the I channel PN code generated from the I channel PN code generator 207 at the fifth multiplier 211, according to the −Q channel PN code generated from the Q channel PN code generator 208 by way of the sixth multiplier 212 at the seventh multiplier 214.

The outputs of the third, fourth, seventh and fifth multipliers 209, 210, 214 and 211 are respectively filtered through the first, second, third, and fourth FIR filters 215, 216, 217, 218. The first adder 219 as an I channel adder, combines the output signals of the first and third FIR filters 215 and 217 for an analog conversion by the first D/A converter 221. The second adder 220 as a Q channel adder, combined the output signals of the second and fourth FIR filters 216 and 218 for an analog conversion by the second D/A converter 222.

The output of the first D/A converter 221 of an I channel component and the output of the second D/A converter 222 of a Q channel component are the signals in which the pilot and data signal components are combined, and are respectively passed through the first and second LPFs 223 and 224. The output of the first LPF 223 is multiplied according to an in-phase component $\cos W_{IF}t$ of the intermediate frequency at the eighth multiplier 225, and the output of the second LPF 224 is multiplied according to a quadrature-phase component $\sin W_{IF}t$ of the intermediate frequency at the ninth multiplier 228. The outputs of the eighth and ninth multipliers 225 and 228 are added at the third adder 229, and the added signal is multiplied by the carrier signal $\cos W_{RF}t$ at the tenth multiplier 230, assuming that, for example, $W_c$ is a carrier frequency, $W_c = Wn_{IF} + W_{RF}$. The output of the tenth multiplier 230 is passed through the first BPR 232, amplified at the amplifier 233, and then propagated to the free space through the antenna 234.

At the receiver side, the spread spectrum signal received via the antenna 301 is passed to the eleventh multiplier 304 through an LNA 302 and a second BPF 303. At the eleventh multiplier 304, the received spread spectrum signal is multiplied according to the carrier signal $\cos W_{RF}t$, and converted into the intermediate-frequency signal. The output of the eleventh multiplier 304 is multiplied according to an in-phase component $\cos W_{IF}t$ of the intermediate frequency at the twelfth multiplier 306, and according a quadrature-phase component $\sin W_{IF}t$ of the intermediate frequency at the thirteenth multiplier 308, and converted into the I channel and Q channel spreaded signals through the third and fourth LPFs 310 and 311. The outputs of the third and fourth LPFs 310 and 311 are converted into the digital signals through the first and second A/D converters 312 and 313. The digital signals are respectively multiplied by the I channel and Q channel PN codes, and despreaded at the first and second despreaders 315 and 316. The PN code component is removed from the despreaded signals by the I channel and Q channel PN codes. Thereafter, the fourteenth multiplier 319 multiplies the despreaded output signal of the first despreader 315 by the first Walsh code. The fifteenth multiplier 320 multiplies the despreaded output signal of the second despreader 316 by the first Walsh code.

The outputs of the fourteenth and fifteenth multipliers 319 and 320 are applied to the initial sync and sync detector 321 to establish the PN code synchronization and synchronization detection operation. The output of the initial sync and sync detector 321 is applied to the PN clock controller 322 for controlling the PN clock generator 323 to generate the PN clock which controls the generation timing of the PN codes of the I channel and Q channel PN code generator 314.

If the PN code synchronization is established at the initial synchronization and synchronization detector 321, the demodulation of the despreaded output signals of the first and second despreaders 315 and 316 is performed to obtain demodulated data.

The output signal of the first despreader 315 is multiplied by the first and second Walsh codes at the seventeenth and nineteenth multipliers 325 and 327. The output signal of the second despreader 316 is multiplied by the first and second Walsh codes at the sixteenth and eighteenth multipliers 324 and 326.

Thus, the outputs of the sixteenth and seventeenth multipliers 324 and 325 are pilot signal components and the outputs of the eighteenth and nineteenth multipliers 326 and 327 are data signal components. The outputs of the sixteenth, seventeenth, eighteenth, and nineteenth multipliers 324 to 327 are respectively accumulated and dumped at the first, second, third, and fourth accumulator and dump circuits 328 to 331. The outputs of the second and third accumulator and dump circuits 329 and 330 are multiplied at the twentieth multiplier 332, and the outputs of the first and fourth accumulator and dump circuits 328 and 331 are multiplied at the twenty first multiplier 333.

The subtractor 334 subtracts the output of the twenty-first multiplier 333 from the output of the twentieth multiplier 332 in order to generate a subtracted value. The decider 335 detects the data phase from the subtracted value of the subtracter 334 in order to generate demodulated data.

In short, as the spread spectrum communication system constructed according to the present invention seeks to transmit the pilot signal representing a binary bit of "1" in a pilot channel in addition to the information signal so that the pilot signal can be used for PN code acquisition at a receiving side. This is because the pilot signal to be transmitted is always "1", and the PN codes at a transmitting side are not modulated but remain pure and unmodulated for transmission through the pilot channel using the Walsh code.

As described above, the present invention is advantageous in that, as the PN code synchronization is established using the pure PN codes, the code acquisition can be easily improved with a lower bit error rate, and the time required to establish initial synchronization can be effectively enhanced. Moreover, another advantage of the present invention is that the pilot channel and the data channel are easily separated by the Walsh codes output from the Walsh code generators.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A spread spectrum communication system, comprising:

a pilot [channel] signal generator for generating a pilot signal exhibiting a predetermined binary value;

a pseudo-random noise generator for generating first and second pseudo-random noise codes [in response to a pseudo-random noise clock];

[first Walsh] *orthogonal* code generator means for generating a first [Walsh] *orthogonal* code according to a first set of [Walsh] *orthogonal code* functions, and generating a second [Walsh] *orthogonal* code according to a second set of [Walsh] *orthogonal code* functions;

modulator means coupled to receive an input information signal and the pilot signal, for modulating the pilot signal according to the first [Walsh] *orthogonal* code and modulating the input information signal according to the second [Walsh] *orthogonal* code to generate a modulated pilot signal and a modulated information signal, respectively; and spreader means for [band] spreading the modulated pilot signal and the modulated information signal with each of the first and second pseudo-random noise codes to generate a spread spectrum signal to be transmitted via a communication channel.

2. The spread spectrum communication system of claim 1, wherein said spreader means comprises:

a first multiplier for multiplying the modulated pilot signal with the first pseudo-random noise code [for an in-phase channel] to produce an in-phase band [spreaded] *spread* pilot signal;

a second multiplier for multiplying the modulated pilot signal with the second pseudo-random noise code [for a quadrature-phase channel] to produce a quadrature-phase band [spreaded] *spread* pilot signal;

a third multiplier for multiplying the second pseudo-random noise code with a predetermined value to produce an inverted pseudo-random noise code;

a fourth multiplier for multiplying the modulated information signal with the first pseudo-random noise code [for an in-phase channel] to produce an in-phase band [spreaded] *spread* information signal;

a fifth multiplier for multiplying the modulated information signal with the inverted pseudo-random noise code [for a quadrature-phase channel] to produce a quadrature-phase band [spreaded] *spread* information signal; *and* [a first set of finite impulse response filters connected to the first, second, fourth, and fifth multipliers, for reducing the peaks of the power spectrum density of the in-phase band spreaded pilot and information signals and the quadrature-phase band spreaded pilot and information signals;]

adder means for combining the in-phase band [spreaded] *spread* pilot [and] *signal with the quadrature-phase band spread* information [signals] *signal* and the quadrature-phase band [spreaded] *spread* pilot [and] *signal with the in-phase* information [signals] *signal* to produce an in-phase signal and a quadrature-phase signal, respectively, *for producing said spread spectrum signal to be transmitted via the communication channel*[; and]

[upconverter means for upconverting the in-phase signal and the quadrature-phase signal and producing said spread spectrum signal to be transmitted via the communication channel].

[3. The spread spectrum communication system of claim 2, wherein said upconverter means comprises:

converter means for generating an in-phase analog signal and a quadrature-phase analog signal by converting the in-phase signal and the quadrature-phase signal into an analog format;

filter means for generating an in-phase filtered signal and a quadrature-phase filtered signal by low-pass filtering the in-phase analog signal and the quadrature-phase analog signal;

first mixer means for multiplying the in-phase filtered signal with an in-phase component of an intermediate frequency signal and the quadrature-phase filtered signal with a quadrature-phase component of the intermediate frequency signal, respectively, and for generating a combined signal based upon the combination of the multiplied results;

second mixer means for generating said spread spectrum signal by multiplying the combined signal with a carrier frequency; and amplifier means for amplifying said spread spectrum signal prior to transmission via said communication channel.]

[4. The spread spectrum communication system of claim 1, further comprising:

means for receiving said spread spectrum signal from said communication channel having a received pseudo-random noise code and a received pilot signal modulated therein, and separating an in-phase signal and an quadrature-phase signal therefrom;

a second pseudo-random noise generator for generating the first and second pseudo-noise codes, respectively, in response to the pseudo-random noise clock;

despreader means for band despreading the in-phase signal and the quadrature-phase signal with each of the first and second pseudo-random noise codes to generate a despreaded in-phase signal and a despreaded quadrature-phase signal;

second Walsh code generator means for generating the first Walsh code according to a first set of Walsh functions, and generating the second Walsh code signal according to a second set of Walsh functions;

first demodulator means for demodulating the despreaded in-phase signal and the despreaded quadrature-phase signal according to the first Walsh code into a demodulated in-phase signal and a demodulated quadrature-phase signal;

pesudo-random noise code control means for receiving the demodulated in-phase signal and the demodulated quadrature-phase signal, and establishing initial synchronization between the received pseudo-random noise code modulated in the received spread spectrum signal and the first and second pseudo-random noise codes by generating the pseudo-random noise clock to control generation of the first and second pseudo-random noise codes; and second demodulator means for demodulating the despreaded in-phase signal and the despreaded quadrature-phase signal according to the first and second Walsh codes to produce a demodulated baseband signal.]

[5. The spread spectrum communication system of claim 4, wherein said receiving means comprises:

bandpass filter means for generating a bandpass filtered signal by bandpass filtering the received spread spectrum signal from said communication channel;

first mixer means for generating an intermediate frequency signal by multiplying the bandpass filtered signal with a carrier frequency;

second mixer means for generating the in-phase signal and the quadrature-phase signal by multiplying the intermediate frequency signal with an in-phase channel component and a quadrature-phase channel component;

low-pass filter means for low-pass filtering the in-phase signal and the quadrature-phase signal; and the quadrature-phase in a digital format.]

[6. The spread spectrum communication system of claim 5, wherein said pseudo-random noise code control means comprises:

pseudo-random code acquisition means for establishing initial synchronization between the received pseudo-random noise code modulated in the received spread spectrum signal and the first and second pseudo-random noise codes;

pseudo-random code detector means for detecting the pseudo-random noise codes of the demodulated in-phase and quadrature-phase signals and generating a sync detection signal;

pseudo-random noise clock control means for generating a clock control signal corresponding to the sync detection signal; and pseudo-random noise clock generator means for generating the pseudo-random noise clock for controlling generation of the first and second pseudo-random noise codes.]

[7. The spread spectrum communication system of claim 6 wherein said second demodulator means comprises:

a first multiplier for generating a first multiplied signal by multiplying the despreaded quadrature-phase signal with the first Walsh code;

a second multiplier for generating a second multiplied signal by multiplying the despreaded in-phase signal with the first Walsh code;

a third multiplier for generating a third multiplied signal by multiplying the despreaded quadrature-phase signal with the second Walsh code;

a fourth multiplier for generating a fourth multiplied signal by multiplying the despreaded in-phase signal with the second Walsh code;

accumulator and dump means connected to the first, second, third, and fourth multipliers, for accumulating the first, second, third, and fourth multiplied signals for a predetermined symbol duration;

fifth multiplier for generating a combined in-phase signal by multiplying the first multiplied signal accumulated for said predetermined symbol duration with the fourth multiplied signal accumulated for said predetermined symbol duration;

a sixth multiplier for generating a combined quadrature-phase signal by multiplying the second multiplied signal accumulated for said predetermined symbol duration with the third multiplied signal accumulated for said predetermined symbol duration; and means for obtaining a difference value between the combined in-phase signal and the combined quadrature-phase signal and generating said demodulated base-band signal corresponding to the phase of the difference value.]

[8. The spread spectrum communication system of claim 4, wherein said pseudo-random noise code control means comprises:

pseudo-random code acquisition means for establishing initial synchronization between the received pseudo-random noise code modulated in the received spread spectrum signal and the first and second pseudo-random noise codes;

pseudo-random code detector means for detecting the pseudo-random noise codes of the demodulated in-phase and quadrature-phase signals and generating a sync detection signal;

pseudo-random noise clock control means for generating a clock control signal corresponding to the sync detection signal; and pseudo-random noise clock generator means for generating the pseudo-random noise clock for controlling generation of the first and second pseudo-random noise codes.]

[9. The spread spectrum communication system of claim 4, wherein said second demodulator means comprises:

a first multiplier for generating a first multiplied signal by multiplying the despreaded quadrature-phase signal with the first Walsh code;

a second multiplier for generating a second multiplied signal by multiplying the despreaded in-phase signal with the first Walsh code;

a third multiplier for generating a third multiplied signal by multiplying the despreaded quadrature-phase signal with the second Walsh code;

a fourth multiplier for generating a fourth multiplied signal by multiplying the despreaded in-phase signal with the second Walsh code;

accumulator and dump means connected to the first, second, third, and fourth multipliers, for accumulating the first, second, third, and fourth multiplied signals for a predetermined symbol duration;

a fifth multiplier for generating a combined in-phase signal by multiplying the first multiplied signal accumulated for said predetermined symbol duration with the fourth multiplied signal accumulated for said predetermined symbol duration;

a sixth multiplier for generating a combined quadrature-phase signal by multiplying the second multiplied signal accumulated for said predetermined symbol duration with the third multiplied signal accumulated for said predetermined symbol duration; and means for obtaining a difference value between the combined in-phase signal and the combined quadrature-phase signal and generating said demodulated base-band signal corresponding to the phase of the difference value.]

10. A spread spectrum receiver, comprising:

means for receiving a spread spectrum *signal* via an antenna having *a pilot signal and an information signal spread by in-phase and quadrature-phase pseudo-random noise codes, respectively,* [a received pseudo-random noise code and a received pilot signal modulated therein,] and separating an in-phase signal and an quadrature-phase signal therefrom;

pseudo-random noise generator means for generating first and second pseudo-random noise codes, respectively, in response to a [pseudo-random noise] clock;

despreader means for [band] despreading the in-phase signal and the quadrature-phase *signal* with each of the first and second pseudo-random noise codes to generate a despreaded in-phase signal and a despreaded quadrature-phase signal;

Walsh code generator means for generating a first [Walsh] *orthogonal* code according to a first set of [Walsh] *orthogonal code* functions, and generating a second [Walsh] *orthogonal* code [signal] according to a second set of [Walsh] *orthogonal code* functions;

first demodulator means for demodulating the despreaded in-phase signal and the despreaded quadrature-phase signal according to the first [Walsh] *orthogonal* code into a demodulated in-phase signal and a demodulated quadrature-phase signal;

pseudo-random noise code control means for receiving the demodulated in-phase and quadrature-phase signals, and establishing initial synchronization between the [received pseudo-random noise code modulated in the received spread spectrum signal] *in-phase and quadrature-phase pseudo-random noise*

*codes* and the first and second pseudo-random noise codes by generating the [pseudo-random noise] clock to control generation of the first and second pseudo-random noise codes; and second demodulator means for demodulating the despreaded in-phase and quadrature-phase signals according to the first and second [Walsh] *orthogonal* codes to produce a demodulated baseband signal.

11. The spread receiver of claim 10, wherein said receiving means comprises:

bandpass filter means for generating a bandpass filtered signal by bandpass filtering the received spread spectrum signal via said antenna;

first mixer means for generating an intermediate frequency signal by multiplying the bandpass [fibered] *filtered* signal with a carrier frequency;

second mixer means for generating the in-phase signal and the quadrature-phase signal by multiplying the intermediate frequency signal with an in-phase channel component and a quadrature-phase channel component;

low-pass filter means for low-pass filtering the in-phase signal and the quadrature-phase signal; and converter means for converting the in-phase signal and the quadrature-phase *signal* in a digital format.

12. The spread spectrum receiver of claim 10, wherein said pseudo-random noise code control means comprises:

pseudo-random *noise* code acquisition means for establishing initial synchronization between the [received pseudo-random noise code modulated in the received spread spectrum signal] *in-phase and quadrature-phase pseudo-random noise codes* and the first and second pseudo-random noise codes;

pseudo-random *noise* code detector means for detecting the *in-phase and quadrature-phase* pseudo-random noise codes of the demodulated in-phase and quadrature-phase signals and generating a sync detection signal;

pseudo-random noise clock control means for generating a clock control signal corresponding to the sync detection signal; and pseudo-random noise clock generator means for generating the [pseudo-random noise] clock for controlling generation of the first and second pseudo-random noise codes.

13. The spread spectrum receiver of claim 10, wherein said second demodulator means comprises:

a first multiplier for generating a first multiplied signal by multiplying the despreaded quadrature-phase signal with the first [Walsh] *orthogonal* code;

a second multiplier for generating a second multiplied signal by multiplying the despreaded in-phase signal with the first [Walsh] *orthogonal* code;

a third multiplier for generating a third multiplied signal by multiplying the despreaded quadrature-phase signal with the second [Walsh] *orthogonal* code;

a fourth multiplier for generating a fourth multiplied signal by multiplying the despreaded in-phase signal with the second [Walsh] *orthogonal* code;

accumulator and dump means connected to the first, second, third, and fourth multipliers, for accumulating the first, second, third, and fourth multiplied signals for a predetermined [symbol] duration;

a fifth multiplier for generating a combined in-phase signal by multiplying the first multiplied signal accumulated for said predetermined symbol duration with the fourth multiplied signal accumulated for said predetermined [symbol] duration;

a sixth multiplier for generating a combined quadrature-phase signal by multiplying the second multiplied signal accumulated for said predetermined symbol duration with the third multiplied signal accumulated for said predetermined [symbol] duration; and means for obtaining a difference value between the combined in-phase signal and the combined quadrature-phase signal and generating said demodulated baseband signal corresponding to the phase of the difference value.

14. The spread spectrum receiver of claim 11, wherein said pseudo-random noise code control means comprises:

pseudo-random *noise* code acquisition means for establishing initial synchronization between the [received pseudo-random noise code modulated in the received spread spectrum signal] *in-phase and quadrature-phase pseudo-random noise codes* and the first and second pseudo-random noise codes;

pseudo-random *noise* code detector means for detecting the *in-phase and quadrature-phase* pseudo-random noise codes of the demodulated in-phase and quadrature-phase signals and generating a sync detection signal;

pseudo-random noise clock control means for generating a clock control signal corresponding to the snyc detection signal; and pseudo-random noise clock generator means for generating the [pseudo-random noise] clock for controlling generation of the first and second pseudo-random noise codes.

15. A transmitter of a spread spectrum communication system using a pilot channel, comprising:

[Walsh] *orthogonal* code generating means for generating first and second [Walsh] *orthogonal* codes having respective code systems;

[Walsh] modulating means for multiplying a predetermined pilot signal and information signal to be transmitted respectively by said first and second [Walsh] *orthogonal* codes and then generating [Walsh-] modulated pilot and information signals;

PN code generating means for generating predetermined first and second pseudo-random noise (PN) codes;

first [band] spread means for multiplying said [Walsh-] modulated pilot signal by said first and second PN codes to produce [band spreaded] *spread* I channel and Q channel pilot signals;

second [band] spread means for multiplying said [Walsh-] modulated information [signals] *signal* by an inverted second PN code and said first PN code to produce [band spreaded] *spread* I channel and Q channel information signals;

finite impulse response filtering means for finite impulse response filtering and [band spreaded] *spread* I channel and Q channel pilot signals and said [band] I channel and Q channel information signals;

first converting means for combining the filtered [band spreaded] *spread* I channel pilot signal and the filtered [band spreaded I] *spread Q* channel information signal and then converting into an I channel analog signal;

second converting means for combining the filtered [band spreaded] *spread* Q channel pilot signal and the filtered [band spreaded Q] *spread I* channel information signal and then converting into a Q channel analog signal;

a low-pass filter for low-pass filtering said I channel and Q channel analog signals to produce I channel and Q channel low-pass filtered signals;

a first mixer for multiplying said I channel low-pass filtered signal by an in-phase component of an intermediate frequency signal and multiplying said Q channel low-pass filtered signal by [an] *a* quadrature-phase component of said intermediate frequency signal, and then combining the I channel and Q channel multiplied signals which have been mixed with said intermediate frequency signal;

a second mixer for multiplying an output signal of said first mixer by a radio frequency signal;

a band-pass filter for band-pass filtering an output signal of said second mixer; and an amplifier for amplifying an output signal of said band-pass filter in accordance with a predetermined amplification ratio to produce a baseband signal.

16. The transmitter of claim 15, wherein said second [band] spread means comprises:

a first multiplier for multiplying said second PN code by "−1" to produce said inverted second PN code;

a second multiplier for multiplying said [Walsh-] modulated information signal by aid inverted second PN code to produce the [band spreaded] *spread* Q channel information signal; and a third multiplier for multiplying said [Walsh-] modulated information signal by said first PN code to produce the [band spreaded] *spread* I channel information signal.

17. A receiver of a spread spectrum communication system using a pilot channel, comprising:

means for receiving a spread spectrum signal from an antenna;

a first filter for generting a band-pass filtered signal by band-pass filtering the received spread spectrum signal;

a first mixer for multiplying the band-pass filtered signal by a radio-frequency signal and then converting into an intermediate-frequency signal;

a second mixer for multiplying the intermediate-frequency signal by an in-phase component and a quadrature-phase component of an intermediate frequency, and generating I channel and Q channel signals in which a carrier frequency has been removed;

a second filter for generating low-pass filtered I channel and Q channel signals by low-pass filtering said I channel and Q channel signals;

converting means for converting the low-pass filtered I channel and Q channel signals into digital-converted I channel and Q channel signals;

PN code generating means for generating first and second PN codes having respective PN code systems in response to a [PN] clock;

I channel despreader means for multiplying the digital-converted I channel signal by said first and second PN codes, and generating a despreaded I channel signal;

Q channel despreader means for multiplying the digital-converted Q channel signal by said first and second PN codes, and generating a despreaded Q channel signal;

[Walsh] *orthogonal* code generating means for generating first and second [Walsh] *orthogonal* codes having respective Walsh code systems; #

PN code sync control means for [Walsh-] demodulating said despreaded I channel and Q channel signals with said first [Walsh] *orthogonal* code, establishing sychronization of the [Walsh] demodulated I channel and Q channel signals, and generating the [PN] clock corresponding to said synchronization;

first [Walsh] demodulating means for receiving and demodulating said despreaded I channel signal in accordance with said first and second [Walsh] *orthogonal* codes to produce [Walsh-] demodulated first and second I channel signals respectively;

second [Walsh] demodulating means for receiving and demodulating said despreaded Q channel signal in accordance with said first and second [Walsh] *orthogonal* codes to produce [Walsh-] demodulated first and second Q channel signals respectively;

combining means for multiplying the [Walsh-] demodulated first and second I channel signals and multiplying the [Walsh-] demodulated first and second Q channel signals to produce a combined I channel signal and a combined Q channel signal; and data deciding means for obtaining a difference value between said combined I channel and Q channel signals to produce a baseband signal corresponding to the phase of said difference value.

18. The receiver of claim 17, wherein said PN code sync control means comprises:

third [Walsh] demodulating means for Walsh-demodulating said despreaded I channel and Q channel signals in accordance with said first [Walsh] *orthogonal* code;

initial sync and sync detection means for establishing synchronization of the [Walsh-] demodulated first and second I channel and Q channel signals and generating a synchronization detection signal corresponding to said synchronization;

PN clock control means for outputting a clock control signal corresponding to said synchronization detection signal; and PN clock generating means for generating the [PN] clock to control generation of said first and second PN codes under the control of said clock control signal.

*19. A spreading circuit, comprising:*

*a first spreader having a first input port, a second input port, and an output port exhibiting a first output signal corresponding to a product of a first input signal and a first spreading code signal applied to said first input port and said second input port, respectively,*

*a second spreader having a third input port coupled to said first input port, a fourth input port, and an output port exhibiting a second output signal corresponding to a product of said first input signal and a second spreading code signal applied to said third input port and said fourth input port, respectively;*

*an inverter having a fifth input port coupled to said fourth input port, and an output port exhibiting a third output signal corresponding to an inversion of said second spreading code signal applied to said fifth input port;*

*a third spreader having a sixth input port coupled to receive said third output signal, a seventh input port, and an output port exhibiting a fourth output signal corresponding to a product of a second input signal and said third output signal applied to said seventh input port and said sixth input port, respectively;*

*a fourth spreader having an eighth input port coupled to said second input port, a ninth input port coupled to said seventh input port, and an output port exhibiting a fifth output signal corresponding to a product of said*

*second input signal and said first spreading code signal applied to said ninth input port and said eighth input port, respectively;*

*a first adder providing a sixth output signal by combining said first output signal and said fourth output signal; and*

*a second adder providing a seventh output signal by combining said second output signal and said fifth output signal.*

*20. The spreading circuit of claim 19, wherein each of said first, second, third and fourth spreader is a multiplier.*

*21. The spreading circuit of claim 19, further comprised of:*

*a first multiplier disposed to generate an eighth output signal by multiplying said sixth output signal by an in-phase component of an intermediate signal;*

*a second multiplier disposed to generate a ninth output signal by multiplying said seventh output signal by a quadrature phase component of said intermediate signal; and*

*a third adder combining said eighth output signal and said ninth output signal.*

*22. The spreading circuit of claim 19, further comprised of:*

*a first multiplier disposed to generate an eighth output signal by multiplying said sixth output signal by an in-phase component of an intermediate signal;*

*a second multiplier disposed to generate a ninth output signal by multiplying said seventh output signal by a quadrature phase component of said intermediate signal;*

*a third adder generating a tenth output signal by combining said eighth output signal and said ninth output signal; and*

*a third multiplier disposed to multiply said tenth output signal by a carrier signal.*

*23. The spreading circuit of claim 19, further comprised of:*

*a first generator providing said first spreading code signal, coupled to said second input port; and*

*a second generator providing said second spreading code signal, coupled to said fourth input port.*

*24. The spreading circuit of claim 19, further comprised of:*

*a first generator providing said first spreading code signal, coupled to said second input port;*

*a second generator providing said second spreading code signal, coupled to said fourth input port;*

*a third generator providing a first orthogonal code;*

*a fourth generator providing a second orthogonal code;*

*a first multiplier disposed to apply said first input signal to said first input port by multiplying said first orthogonal code by a first applied signal; and*

*a second multiplier disposed to apply said second input signal to said seventh input port by multiplying said second orthogonal code by a second applied signal.*

*25. The spreading circuit of claim 21, further comprised of:*

*a first generator providing said first spreading code signal, coupled to said second input port;*

*a second generator providing said second spreading code signal, coupled to said fourth input port;*

*a third generator providing a first orthogonal code;*

*a fourth generator providing a second orthogonal code;*

*a third multiplier disposed to apply said first input signal to said first input port by multiplying said first orthogonal code by a second applied signal; and*

*a fourth multiplier disposed to apply said second input signal to said seventh input port by multiplying said second orthogonal code by a first applied signal.*

*26. A complex spreading circuit, comprising:*

*a first stage disposed to separately spread a first input signal by an in-phase pseudo-random noise code and a quadrature-phase pseudo-random noise code to provide respectively a first output signal corresponding to a product of said first input signal and said in-phase pseudo-random noise code, and a second output signal corresponding to a product of said first input signal and said quadrature-phase pseudo-random noise code;*

*a second stage disposed to separately spread a second input signal by an inversion of said quadrature-phase pseudo-random noise code and by said in-phase pseudo-random noise code, to provide respectively a third output signal corresponding to a product of said second input signal and said inversion of said quadrature-phase pseudo-random noise code, and a fourth output signal corresponding to a product of said second input signal and said in-phase pseudo-random noise code; and*

*a third stage providing a fifth output signal by combining said first output signal with said third output signal, and providing a sixth output signal by combining said second output signal with said fourth output signal.*

*27. The complex spreading circuit of claim 26, further comprised of a multiplier having a first input port coupled to receive said quadrature-phase pseudo-random noise code and an output port exhibiting said inversion of said quadrature-phase pseudo-random noise code.*

*28. The complex spreading circuit of claim 26, further comprised of:*

*a first multiplier disposed to generate a seventh output signal by multiplying said fifth output signal by an in-phase component of an intermediate signal;*

*a second multiplier disposed to generate an eighth output signal by multiplying said sixth output signal by a quadrature phase component of said intermediate signal; and*

*an adder combining said seventh output signal and said eighth output signal.*

*29. The complex spreading circuit of claim 26, further comprised of:*

*a first multiplier disposed to generate a seventh output signal by multiplying said fifth output signal by an in-phase component of an intermediate signal;*

*a second multiplier disposed to generate an eighth output signal by multiplying said sixth output signal by a quadrature phase component of said intermediate signal;*

*an adder combining said seventh output signal and said eighth output signal; and*

*a third multiplier disposed to multiply an output signal of said adder by a carrier signal.*

*30. The complex spreading circuit of claim 26, further comprised of:*

*a first generator providing a first orthogonal code;*

*a second generator providing a second orthogonal code;*

*a first multiplier disposed to generate said first input signal by modulating a first received signal with said first orthogonal code; and*

*a second multiplier disposed to generate said second input signal by modulating a second received signal with said second orthogonal code.*

*31. The complex spreading circuit of claim 30, further comprised of:*

*a third multiplier disposed to generate a seventh output signal by multiplying said fifth output signal by an in-phase component of an intermediate signal;*

*a fourth multiplier disposed to generate an eighth output signal by multiplying said sixth output signal by a quadrature phase component of said intermediate signal;*

*an adder combining said seventh output signal and said eighth output signal; and*

*a fifth multiplier disposed to multiply an output signal of said adder by a carrier signal.*

*32. A method of spreading first and second input signals with first and second spreading code signals in a transmitter of a spread spectrum communication system, comprising:*

*spreading said first signal with said first and second spreading code signals to produce first and second spread signals, respectively;*

*spreading said second signal with said first and second spreading code signals to produce a third spread signal and an inversion of a fourth spread signal, respectively;*

*producing a first output spread signal by combining said inversion of said fourth spread signal and said first spread signal; and*

*producing a second output spread signal by combining said second spread signal and said third spread signal.*

*33. A method of spreading first and second input signals in a transmitter of a spread spectrum communication system, comprising:*

*spreading said first input signal with in-phase and quadrature-phase spreading code signals to produce first and second spread signals, respectively;*

*spreading said second input signal with said in-phase and quadrature-phase spreading code signals to produce a third spread signal and an inverted fourth spread signal, respectively;*

*producing a first output spread signal by adding said inverted fourth spread signal and said first spread signal; and*

*producing a second output spread signal by adding said second spread signal and said third spread signal.*

*34. A spread spectrum signal, comprising:*

*a first signal in-phase spread produced by multiplying said first signal with an in-phase pseudo-random noise code, combined with a second signal quadrature-phase spread produced by multiplying said second signal with an inversion of a quadrature-phase pseudo-random noise code; and*

*a first signal quadrature-phase spread produced by multiplying said first signal with said quadrature-phase pseudo-random noise code, combined with said second signal in-phase spread produced by multiplying said second signal with said in-phase pseudo-random noise code.*

*35. A method of spreading first and second input signals with first and second spreading code signals in a transmitter of a spread spectrum communication system, comprising:*

*spreading said first signal with said first and second spreading code signals to produce first and second spread signals, respectively;*

*spreading said second signal with said first and second spreading code signals to produce third and fourth spread signals, respectively;*

*producing a first output spread signal by subtracting said fourth spread signal from said first spread signal; and*

*producing a second output spread signal by adding said second spread signal and said third spread signal.*

*36. A circuit for spreading first and second input signals with first and second spreading code signals in a tranmitter of a spread spectrum communication system comprising:*

*a first stage disposed to spread said first input signal with said first and second spreading code signals to produce first and second spread signals, respectively;*

*a second stage disposed to spread said second input signal with said first and second spreading code signals to produce a third spread signal and an inversion of a fourth spread signal, respectively;*

*a third stage producing a first output spread signal by combining said inversion of said fourth spread signal and said first spread signal; and*

*a fourth stage producing a second output spread signal by combining said second spread said and said third spread signal.*

*37. A circuit for spreading first and second input signals in a transmitter of a spread spectrum communication system, comprising:*

*a first stage disposed to spread said first input signal with in-phase and quadrature-phase spreading code signals to produce first and second spread signals, respectively;*

*a second stage disposed to spread said second input signal with said in-phase and quadrature-phase spreading code signals to produce a third spread signal and an inverted fourth spread signal, respectively;*

*a third stage producing a first output spread signal by adding said inverted said fourth spread signal and said first spread signal; and*

*a fourth stage producing a second output spread signal by adding said second spread signal and said third spread signal.*

*38. The method of claim 32, further comprised of generating said inversion of said fourth spread signal by inverting said second spreading code signals prior to said spreading of said second signal with said second spreading code signals.*

*39. The method of claim 33, further comprised of generating said inverted fourth spread signal by inverting said quadrature-phase spreading code signals prior to said spreading of said second input signal with said quadrature-phase spreading code signals.*

*40. The circuit of claim 36, wherein said second stage further comprises an inverter coupled to apply an inversion of said second spreading code signals to produce said inversion of said fourth spread signal.*

*41. The circuit of claim 37, wherein said second stage further comprises an inverter coupled to apply an inversion of said quadrature-phase spreading code signals to produce said inverted fourth spread signals.*

* * * * *